US006901171B1

(12) United States Patent
Dutta-Choudhury et al.

(10) Patent No.: US 6,901,171 B1
(45) Date of Patent: May 31, 2005

(54) METHODS AND APPARATUSES FOR REFINING GROUPINGS OF EDGE POINTS THAT REPRESENT A CONTOUR IN AN IMAGE

(75) Inventors: Paul Dutta-Choudhury, Franklin, MA (US); Len L. Picard, Newtonville, MA (US)

(73) Assignee: Cognex Technology and Investment Corporation, Mountain View, CA (US)

( * ) Notice: Subject to any disclaimer, the term of this patent is extended or adjusted under 35 U.S.C. 154(b) by 0 days.

(21) Appl. No.: 09/449,235

(22) Filed: Nov. 24, 1999

Related U.S. Application Data

(60) Provisional application No. 60/131,932, filed on Apr. 30, 1999.

(51) Int. Cl.[7] .................................................. G06K 9/40
(52) U.S. Cl. ....................................... 382/266; 382/199
(58) Field of Search .............................. 382/151, 199, 382/200, 205, 206, 263, 266, 256, 272, 273

(56) References Cited

U.S. PATENT DOCUMENTS

| | | | |
|---|---|---|---|
| 3,069,654 A | | 12/1962 | Hough ....................... 382/281 |
| 4,644,583 A | | 2/1987 | Watanabe et al. ........... 382/199 |
| 4,731,858 A | | 3/1988 | Grasmueller et al. ....... 382/151 |
| 5,081,689 A | | 1/1992 | Meyer et al. ................ 382/199 |
| 5,398,292 A | * | 3/1995 | Aoyama ...................... 382/199 |
| 5,412,742 A | | 5/1995 | Takasaki et al. ............ 382/316 |
| 5,418,892 A | | 5/1995 | Aghajan et al. ............ 345/418 |
| 5,422,962 A | | 6/1995 | Yasukawa et al. .......... 382/295 |
| 5,636,297 A | * | 6/1997 | Eller et al. .................. 382/293 |
| 5,657,403 A | | 8/1997 | Wolff et al. ................. 382/302 |
| 5,680,471 A | * | 10/1997 | Kanebako et al. .......... 382/128 |
| 5,872,870 A | * | 2/1999 | Michael ...................... 382/291 |

OTHER PUBLICATIONS

Bookstein, F. L., "The Line–Skeleton", Computer Graphics and Image Processing 11, Academic Press, Inc. (1979).
Burns et al., "Extracting Straight Lines", IEEE Transcations on Pattern Analysis and Machine Intelligence, vol. Pami–8, No. 4, Jul. 1986.
Canny, J. F., "Finding Edges and Lines in Images", Massachusetts Institute of Technology, Jun. 1983.
Cognex 3000/4000/5000, Programmable Vision Engines, Image Processing, "Edge Detection Tool", Chapter 4, pp. 215–216 (1996).
Cognex 3000/4000/5000 Programmable Vision Engines, Vision Tools, "Line Finder", Chapter 3, pp. 166–175 (1996).
Dorst et al., "The Estimation of Parameters of Digital Straight Line Segments", IEEE Computer Society Press, 6th International Conference on Pattern Recognition, Oct. 1982.
Freeman, H., "Computer Processing of Line–Drawing Images", Computing Surveys, vol. 6, No. 1, Jan. 1974.
Grimson et al., "On the Sensitivity of the Hough Transform for Object Recognition", IEEE Transactions on Pattern Analysis and Machine Intelligence, vol. 12, No. 3, Mar. 1990.
Horn, B. K. P., "Robot Vision", pp. 47–55, The MIT Press, Cambridge, Massachusetts (1993).

(Continued)

*Primary Examiner*—Samir Ahmed
(74) *Attorney, Agent, or Firm*—Tracy Calabresi

(57) ABSTRACT

Methods and apparatuses are disclosed for refining groupings of edge points that represent contours in an image. The methods and apparatuses decrease data dispersion and data quantization effects. The methods and apparatuses are particularly useful for accurate and robust detection of straight line-segment features contained in noisy, cluttered imagery occurring in industrial machine vision applications. Additionally, a measurement criterion of the quality of the detected line segments is introduced.

31 Claims, 14 Drawing Sheets

OTHER PUBLICATIONS

Jain et al., "Algorithms for Clustering Data", Chapter 3, pp. 89–101, Prentice Hall, Englewood Cliffs, New Jersey (1988).

MacVicar–Whelan et al., "Line finding with subpixel precision", SPIE, Techniques and Applications of Image Understanding, vol. 281 (1981).

Niblack et al., "On Improving the Accuracy of the Hough Transform: Theory, Simulations and Experiments", IBM Research Report, Almaden Research Center, Mar. 1988.

* cited by examiner

METHODS AND APPARATUSES FOR REFINING GROUPINGS OF EDGE POINTS THAT REPRESENT A CONTOUR IN AN IMAGE

This application claims the benefit of U.S. Provisional Application No. 60/131,932, filed Apr. 30, 1999.

FIELD

This invention relates to machine vision, and particularly to methods and apparatuses for interpretation of edge point data from an image.

BACKGROUND

Dispersion of data is a common problem in many fields, including image processing. In image processing, data fails to converge to one grouping for numerous reasons, such as, imperfections in the imaging environment, the algorithm(s) employed, and/or the discrete nature of processing the data using a computer. Data dispersion detrimentally affects some types of image processing more than others. For instance, finding lines in images is more detrimentally effected by dispersion than finding regions. Typically, the integrity of smaller groupings of data, such as lines, relative to the remainder of the image, suffer more from dispersion effects. It is also difficult to identify elements composed of a relatively small amount of data because of confusing appropriate data with superfluous data.

An example of dispersion of edge points of a line is illustrated using FIG. 1, not drawn to scale, which depicts an imaged line 102 having multiple edge-point directions 100, shown schematically. An edge point is derived from underlying image pixels, where an image pixel is a picture element characterized by a grey value, where an image can be represented as an array of image pixels. A plurality of connected edge points creates a contour, such as a line or boundary 200 between two regions 202 and 204, illustrated in FIG. 2. The direction of an edge point 210 is perpendicular to the line 200 upon which the edge point 208 resides. Turning back to FIG. 1, the edge points 110 of the line 102 do not share a common direction 100, but are distributed about a peak angle, as shown in the discrete-angle histogram 104. The edge-point directions 100 fall into multiple discrete bins 108 that are distributed around a peak bin 106, where the peak bin 106 represents the mode of the histogram (i.e. the primary direction of the edge points 1 10 in the line 102). The lack of convergence of all the edge points 110 to the peak bin 106 illustrates the typical data dispersion present for lines in images. Lines detected using the Hough line-transform method also suffer from this problem.

The majority of line finding algorithms in machine-vision applications, are variations of the Hough line-transform method, described in U.S. Pat. No. 3,069,654. The Hough line-transform method transforms characteristics of edge points into line characteristics, and represents the line characteristics on a Hough space, where a point in the Hough space represents a line.

The characteristics of the edge points include the edge-point position, denoted (x, y), edge-point direction, denoted $\theta$, and optionally, edge-point magnitude, denoted M, which are all measured in Cartesian space. The edge-point position is typically a function of the position of a neighborhood of the underlying image pixels. The edge-point magnitude and direction are a function of the change in grey value of the image pixels that contribute to the edge point.

The characteristics of an edge point, ($\theta$, x, y, and optionally M) are transformed into line characteristics (d, c, and $\alpha$). Typically, the characteristics of edge points in a contour are called features (such as position), while characteristics derived from the features are called parameters (such as line angle).

The line characteristics are illustrated in Cartesian space in FIG. 3. The line characteristics include a line angle 302, denoted $\alpha$, which is the angle of the line 300 from the horizontal, a distance-vector 304, denoted d, which is the shortest distance from the origin of a coordinate system 314 to the line 300, and, optionally, a collinear distance 306, denoted c, which is the distance from the edge point 308 to the place where d touches the line 300, in Cartesian space. d is signed to differentiate between lines with identical $\alpha$ and d parameters on opposite sides of the origin 314. More specifically, the sign of d is negative if the angle 312 of d from the horizontal in Cartesian coordinates is less than 180° and greater than, or equal to, zero (i.e., 180°>$\beta$≧0); and positive when the angle 312 of d is less than 360°, and greater than, or equal to, 180° (i.e., 360°>$\beta$≧180°).

d, c, and $\alpha$ are generated from the following Hough-transform equations:

$$d = x \cdot \sin(\theta) - y \cdot \cos(\theta) \quad [1]$$

$$c = x \cdot \cos(\theta) + y \cdot \sin(\theta) \quad [2]$$

$$\alpha_{degrees} = [\theta + 90]_{mod\,180} \quad [3]$$

d and $\alpha$ are stored on a Hough space.

FIG. 4A depicts an instance of a Hough space 400 for lines. The Hough space for lines is a two-dimensional space in which lines from an image are recorded. The Hough space is adequately represented as a two-dimensional array of bins 402. One axis 404 represents the line-angle, $\alpha$, and the other axis 406 represents the distance vectors, d. A point on a Hough space represents a line.

During the transformation, for each edge point in an input image: the values of d and $\alpha$ are calculated, and the bin of the Hough space, whose range includes the value of d and $\alpha$ for each edge point, is incremented. Once all the edge points in the input image have been examined, the Hough space is searched for maximum values, using peak detection, a method known in the art. The bin having the highest value in the Hough space represents the strongest line detected in the input image, the second highest local maxima represents the second strongest line detected, and so forth.

Each bin 402 in the Hough space represents a discrete range of angles and a discrete range of distance vectors. FIG. 5 shows an instance of a quantization of the angles for a Hough space, where 360° is divided into 64 bins. Each of the 64 bins has a range of 5.62 degrees per bin, where the first bin accommodates the angles within 0–5.62°, the second bin accommodates the angles within 5.62°–11.24°, and so on.

Typically, the line-angle range and/or distance-vector range for each bin in the Hough space, and the divisions of ranges between the bins, are driven by system and application parameters, and often do not exactly represent the line angles or distance vectors in a given. image. Thus, the partitioning of the line angle and: the distance vector into discrete bins hinders detecting lines whose edge points straddle the boundaries, such as lines with a line angle of 5.62°, in the above example. The edge points of such lines, typically, transform into more than one bin, thus, it is more difficult to detect these lines, as is further discussed in J. Brian Burns, Allen R. Hanson, and Edward M. Riseman, "Extracting Straight Lines", IEEE Transactions on Pattern Analysis and Machine Intelligence, 8(4), 1986.

The effects of dispersion and the number of partitions in an axis are decreased by increasing the range of data accepted in each bin. However, increasing the range decreases precision of the line angles and/or distance vectors. As illustrated using FIG. 6, which depicts a 59° line 600 and a 51° line 610 and their respective discrete-angle histograms 602 and 612 derived from a Hough space. A Hough space created using a four-bit representation for angle partitions the line-angle axis of the Hough space so that the edge points 604 and 614 of both lines 600 and 610 all map to bin two in the Hough space. Thus, the ability is lost to distinguish between a 51° line and 59° line in Hough space.

Other techniques known in the art, such as a Point Spread Function update method, for example, also decrease dispersion effects. For each edge point, the Point Spread Function update method increments more than one bin with a partial weighting. Although the edge points do not contribute 100% to the weight of the appropriate bin, it is less likely any edge points fail completely to contribute to the weight of the appropriate bin. Although the Point Spread Function update method compensates, in part, for dispersion, it also causes a loss of precision because the Point Spread Function tends to smear the Hough space peaks.

An additional problem with image processing smaller contours is the inability to identify appropriate groupings of edge points of each contour given the superfluous noise and background clutter. The paper W. Eric L. Grimson and Daniel P. Huttenlocher "On the Sensitivity of the Hough Transform for Object Recognition," Transactions on Pattern Analysis and Machine Intelligence, 12(3), 1990, discusses how line finding and object detection using Hough transforms suffers from superfluous noise and background clutter, particularly when trying to detect shorter lines.

Also, the Hough transform is only as precise as the underlying edge-point data, which is limited according to current technology. Further, the precision cannot be greatly increased by interpolating the edge-point data to a higher number of bits because, eventually, the interpolated bits do not represent meaningful precision.

SUMMARY

The invention provides methods and apparatuses for refining groupings of edge points that represent contours in an image. A contour is refined by refining the edge points of which the contour is comprised. More particularly, the grouping of edge points representing a contour is changed by annexing an edge point (termed annexed edge-point) from a grouping to the contour grouping (termed a seed population) to create a refined grouping of edge points (i.e., a refined contour).

Initially, each of the groupings has a parameter range, and each edge point within the groupings has a parameter substantially within the respective parameter range. The parameter range of the seed population is termed a seed-parameter range.

Before the edge point can be annexed, a refined parameter for the edge point is calculated. An edge point is annexed by the seed population when the refined parameter of the edge point is substantially within the seed-parameter range. Thus, the edge points of the refined grouping (i.e., the seed population plus the annexed edge points) all have a parameter, or a refined parameter, within the same range as the parameter of the seed population (i.e., the seed-parameter range).

The refined parameter is generated by re-calculating the parameter of the annexed edge-point. In one embodiment, the refined-parameter calculation differs from the parameter calculation for each edge point in that the refined-parameter calculation uses the individual characteristics of the entire seed population, while the parameter calculation uses individual characteristics of the edge point. More particularly, an intermediate characteristic is calculated from the individual characteristics of the seed population, and the intermediate characteristic is used in the parameter calculation to generate the refined parameter.

In a preferred embodiment, the refined parameter for a Hough representation of a line is a refined distance-vector, and at least one of the parameters is a distance vector. The distance-vector calculation for each edge point is a function of the edge-point direction and edge-point position (i.e. the individual characteristics of the edge-point), while the refined-distance-vector calculation for the same edge point is a function, not only of the edge-point position (i.e. an individual characteristic), but also of the positions of the edge points from the entire seed population.

More particularly, the refined distance vector is calculated using an angle of a least-squares-fit line to the edge points of the seed population in the distance-vector calculation of a Hough line-transformation. A least-squares line is fit to the edge-point positions of the edge points in a local maxima bin, termed seed population, of the Hough space. The angle of the least-squares line, denoted an intermediate line-angle, is used to re-compute the distance vector of edge points in the bins that-neighbor the seed-edge population. The arguments of the refined-distance-vector equation are the intermediate line-angle and the edge-point position, which was computed during edge detection. If the refined distance-vector falls within the range of the seed-edge population, then the seed-edge population annexes the edge point, thus, becoming an annexed edge-point. In one embodiment, the annexed edge-point is removed from its original bin and added to the bin of the seed population.

In the preferred embodiment, the positions of the edge points in each grouping are stored.

Among others, the invention recognizes that retaining the position of edge points in a parameter space makes the positions available for other calculations, such as computing the line angle of each bin in the parameter space. Further, using the teachings herein, those skilled in the art should recognize that retaining edge characteristics throughout a transformation is advantageous in many applications.

In other embodiments, one or more edge points are annexed from the same and/or other groupings of edge points to one or more seed populations to further refine, and/or generate more refined groupings of edge points.

The contour to be refined is first chosen by ranking the groupings into an ordered set, where at least one of the groupings is denoted the seed population (i.e. the contour grouping to be refined).

In further aspects, groupings of edge points are denoted seed populations according to an order of the groupings of edge points in the ordered set. In one embodiment, groupings of edge points are ordered according to the value of variances among the collinear distances of the edge points in each of the bins and/or the number of the edge points in each of the bins. When more than one seed population is refined, the order in which the seed populations are refined is sequential, according to the position of the seed populations in the ordered set.

In further aspects, the invention scores the refined lines according to an edge-point polarization of each line.

In one embodiment, a dual hybrid space is created from a first parameter space and a second parameter space to refine one of the parameters of the contours. The first parameter space and the second parameter space contain the same edge points (i.e. data), and are offset from each other in a first dimension, such as angle or distance. The first parameter space and the second parameter space are merged to create the hybrid-space, where each of the edge points is represented once in the hybrid-space. Thus, the hybrid space allows refinement of the parameter represented on the first dimension.

In a preferred embodiment, edge points are annexed along one dimension of a Hough space, while a dual Hough space compensates for the second dimension by offsetting the two constituent spaces in the second dimension. Thus, both dimensions of the Hough space are refined.

The invention also recognizes that groupings of edge points can be refined by using characteristics of, the groupings, and/or the edge points in the groupings, in a way other than the way the grouping was generated. More particularly, using characteristics of, a primary grouping, and/or the edge points in the primary grouping, to compare an edge point of another grouping to the primary grouping, where the primary grouping is also called herein the seed population.

Among other advantages, the method recovers edge points, which are otherwise lost due to dispersion and/or quantization, by annexing the edge points into a primary grouping. The annexation of the edge points reinforces the primary grouping, while simultaneously reducing, and sometimes eliminating, the effects of dispersion.

Another advantage of the invention, as applied to line detection, is that the invention generates a line angle that is not limited to the precision of a single edge point. Instead, the line angle is interpolated based upon the position of all the edge points of the line.

The invention overcomes various problems with the prior art, including, but not limited to, minimizing the effect of, and decreasing the extent of, dispersion of edge points; minimizing the effect of the dispersion of edge points while maintaining accuracy of the grouping of edge points (i.e., keeping line angles accurate without making the bin ranges larger or without using the partial weighting method, for example); de-emphasizing the effect of quantizing ranges of features of edge points or quantizing ranges of parameters derived from features of edge points; finding a line that straddle boundaries between the edge-point quantizations in a Hough space; and decreasing the sensitivity of a Hough transform to false edge-point peaks due to noise or other superfluous edge points.

The invention is particularly helpful for accurately and robustly detecting straight-line contours in noisy, cluttered imagery.

In further aspects, the invention provides apparatuses in accord with the methods described above. The aforementioned and other aspects of the invention are evident in the drawings and in the description that follows.

BRIEF DESCRIPTION OF THE DRAWINGS

The invention will be more fully understood from the following detailed description, in conjunction with the accompanying FIGS., wherein.

DETAILED DESCRIPTION

The methods and apparatuses disclosed herein refine groupings of edge points that represent contours in an image. The method is particularly useful for refining straight-line segments identified using a Hough transformation, where the straight-line segments are from production images typically available in the semiconductor and electronics industries. Though this is the form of a preferred embodiment, this embodiment should be considered illustrative, and not restrictive.

Figure 7:
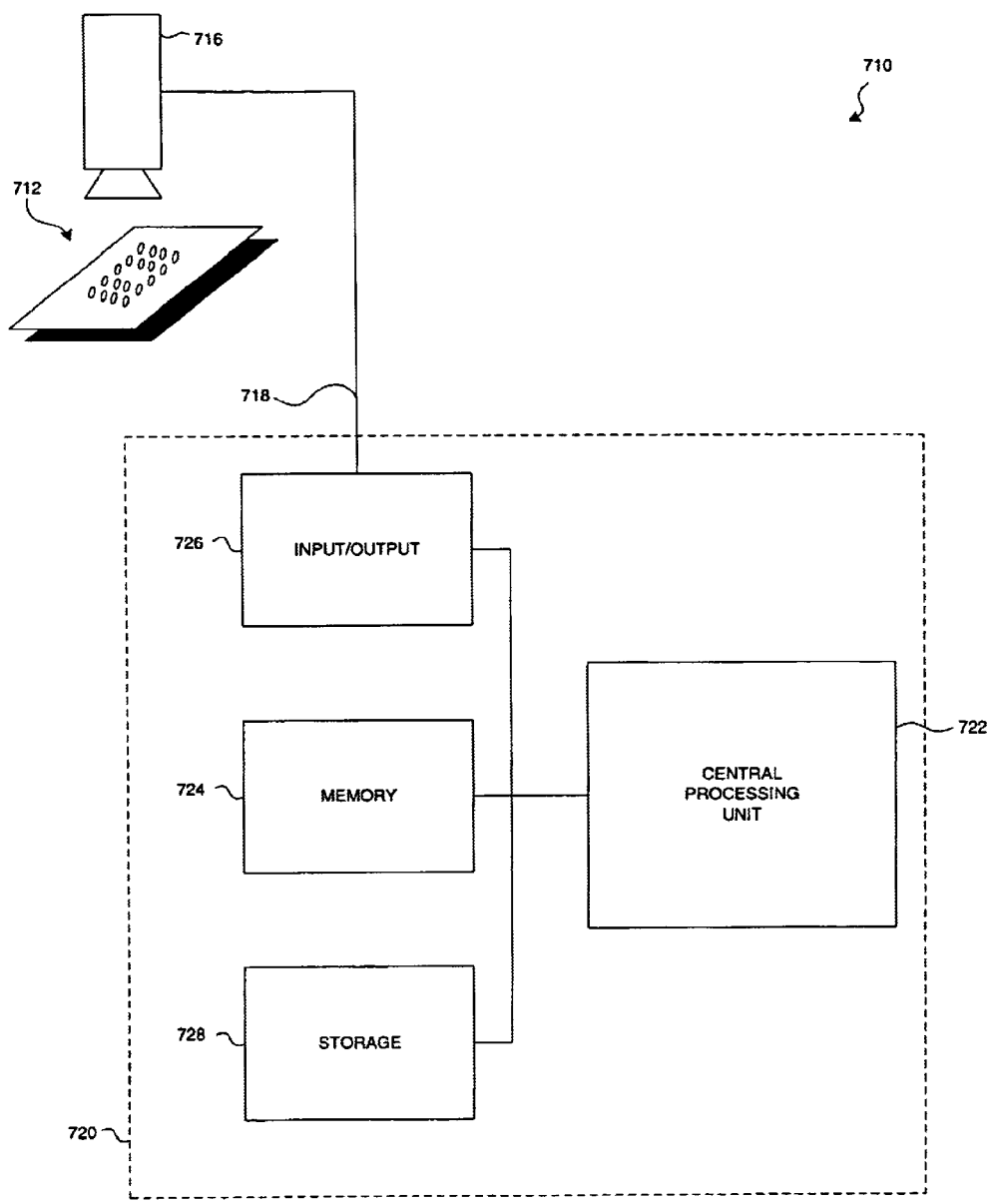
FIG. 7 is a schematic diagram of a machine-vision system for practice of the invention.

FIG. 7 illustrates a machine system 710 of the type in which the invention is practiced. The system 710 includes a capturing device 716, such as a conventional video camera or scanner that generates an image of an object 712. Image data (or pixels) generated by the capturing device 716 represent, in the conventional manner, the image intensity (e.g. color or brightness) of each point in the scene at the resolution of the capturing device 716.

The capturing device 716 transmits the digital image data via a communications path 718 to an image analysis system 720. This can be a conventional digital data processor, or a vision processing system of the type commercially available, for example, from the assignee hereof, Cognex Corporation, programmed in accord with the teachings hereof to refine groupings of edge points from an image.

The image analysis system 720 may have one or more central processing units 722, main memory 724, an inputoutput system 726, and one or more disk drives (or other mass storage device) 728, all of the conventional type.

The system 720 and, more particularly, central processing unit 722, is configured by programming instructions according to the teaching hereof to refine groupings of edge points from an image, as described in further detail below. Those skilled in the art will appreciate that, in addition to implementation on a programmable digital data processor, the methods and apparatuses taught herein can be implemented in special purpose hardware.

Figure 8:
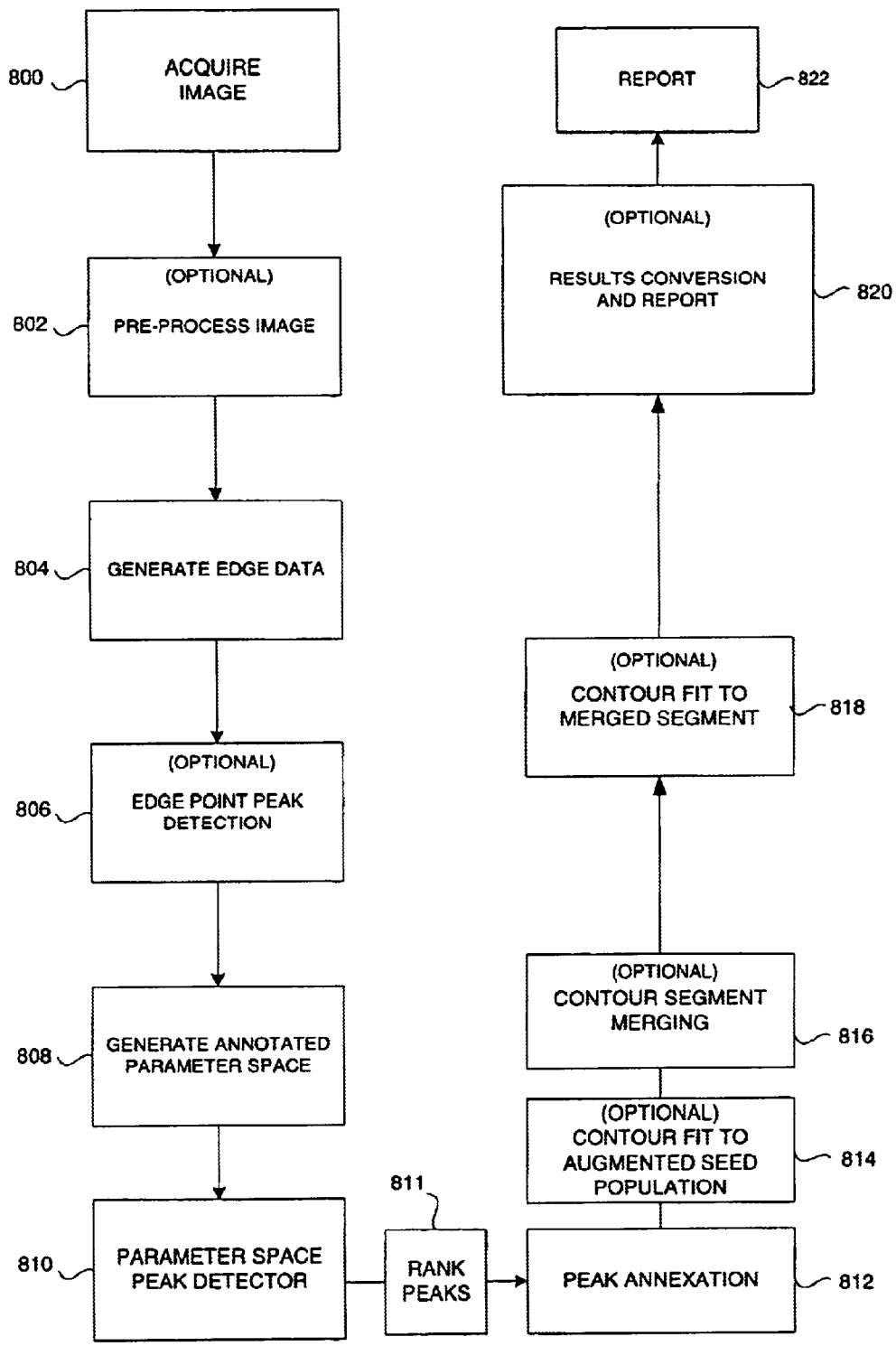
FIG. 8 is a flowchart summarizing operation of a preferred embodiment of a method according to the invention that refines a contour represented on a parameter space.

FIG. 8 illustrates a flowchart detailing a preferred embodiment of the method of the invention, where steps of the method are denoted in the detailed description in parentheses. One instance of a preferred embodiment is refining contours that are represented on a parameter space.

First, an input image is acquired (800), and, optionally, pre-processed (802), as known in the art. The pre-processing is application specific, and can include known techniques, such as smoothing and sub-sampling, for example.

Next, the edge data is generated (804) using edge detection, a technique known in the art, such as Sobel edge detection, for example. The edge data generated includes, edge-point position, edge-point direction, and edge-point magnitude. In a preferred embodiment, the edge-point position is generated to sub-pixel precision by the method described in commonly assigned U.S. Pat. No. 5,657,403 or other tools known in the art.

Although edge data is generated for many positions in the image, the edge data is significant only for edge points having stronger edge-point magnitudes. Insignificant edge points due to frame grabber noise, other imaging environment issues, or random fluctuations in pixel values, typically, increase processing time without adding precision, and often make it difficult to evaluate the edge data in the image. Optionally, these insignificant edge points are removed. In addition, edge-point magnitude values usually increase gradually in a "smear" as they approach an edge and then decrease as the edge is crossed. Optionally, some of the edge points that are near, but not at, an edge are also removed.

Preferably, the edge points are removed using peak detection (806), a technique known in the art, which thins out the edge points before the edge points are used to generate the parameter space (808). Optimally, the peak detector removes the edge points that are not peak points, thereby, leaving a single point-wide contour. As known in the art, peak points, typically, are stronger than an ambient level and have a value that is greater than, or equal to, the neighboring points of a two-point, four-point, or eight-point neighborhood, as further described in Cognex 3000/4000/5000, Programmable Vision Engines, Image Processing, Chapter 4 Edge Detection Tool, pages 215–216, (1996) incorporated herein by reference.

Next, a parameter space is formatted to store the edge-point data. The parameter space used depends on the contour being refined and the parameterization chosen for the contour, where the contour can be a line, a circle, an arc, or a generic boundary, for example. Preferably, the contour is one that can be defined by a mathematical description. Further, as known in the art, the same contour can be represented by multiple parameterizations. It should also be apparent that one or more parameters can be represented for each contour on the parameter space.

Figure 1:
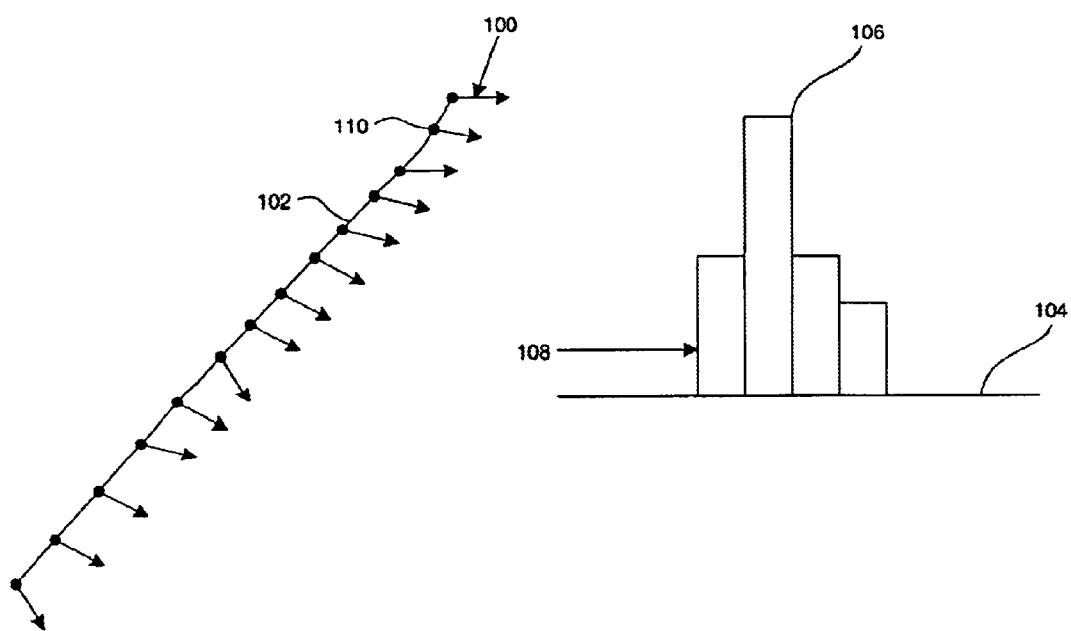
FIG. 1 depicts a contour, edge-points of the contour, and edge-point directions. Also shown is a histogram of the edge-point directions.
Figure 2:
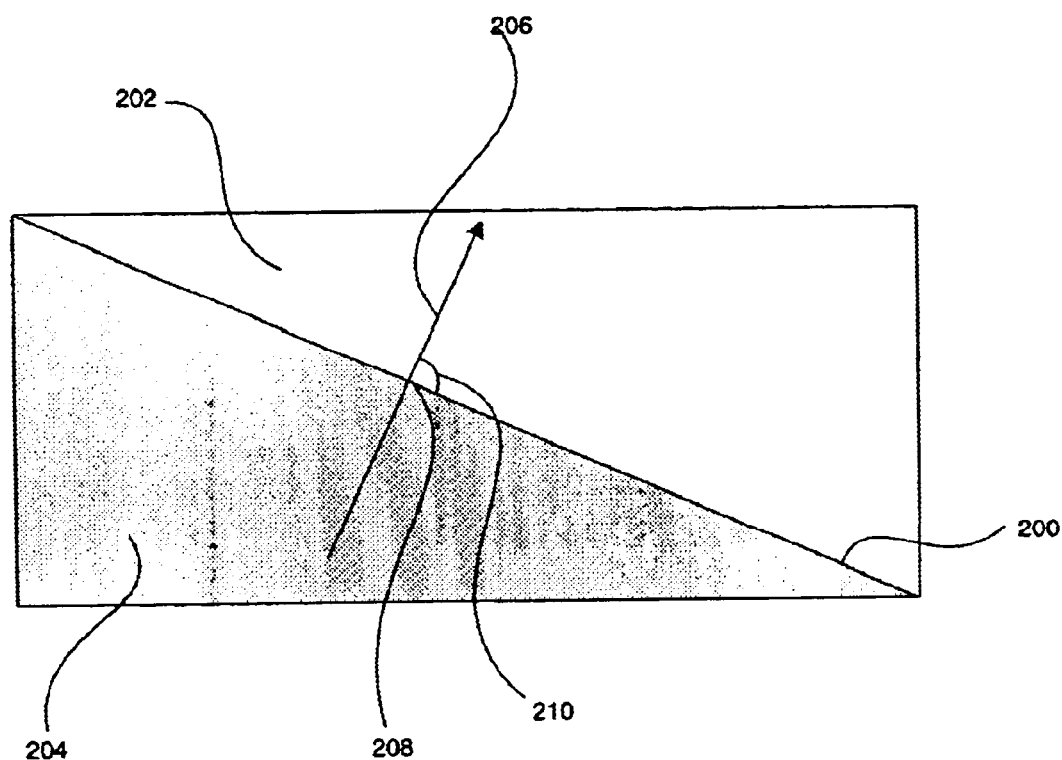
FIG. 2 is a graphical representation of an edge and the direction of an edge point.
Figure 3:
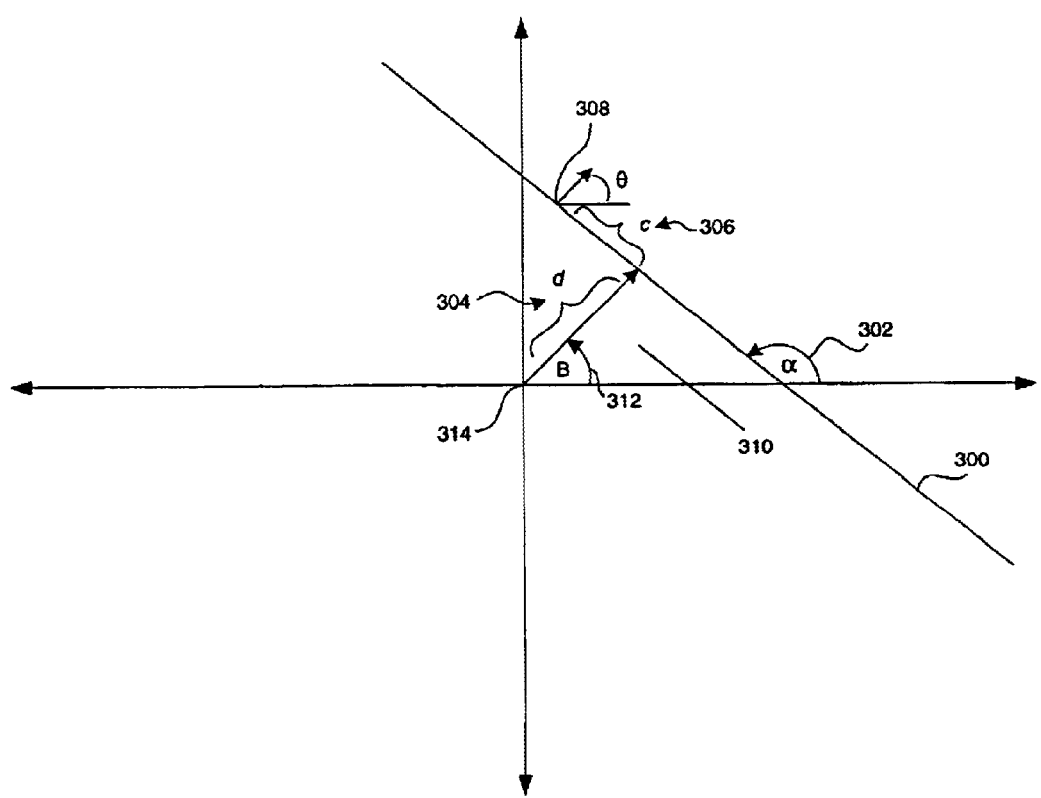
FIG. 3 illustrates a line-parameterization format that includes a distance vector, line angle for a line, and a collinear distance of one of the edge points of the line.
Figure 4A:
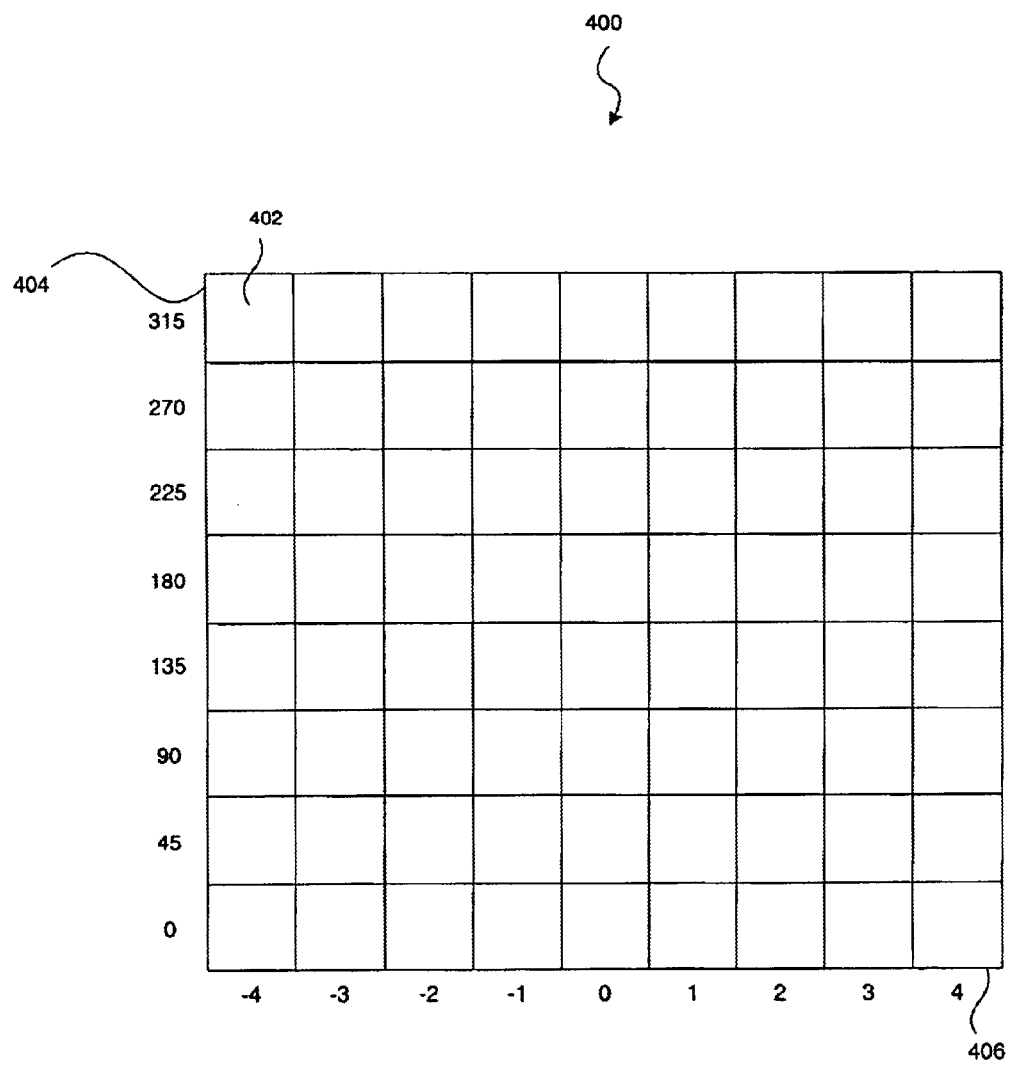
FIG. 4A is a graphical diagram of a traditional Hough space for lines, which uses the line format depicted in FIG. 3.
Figure 4B:
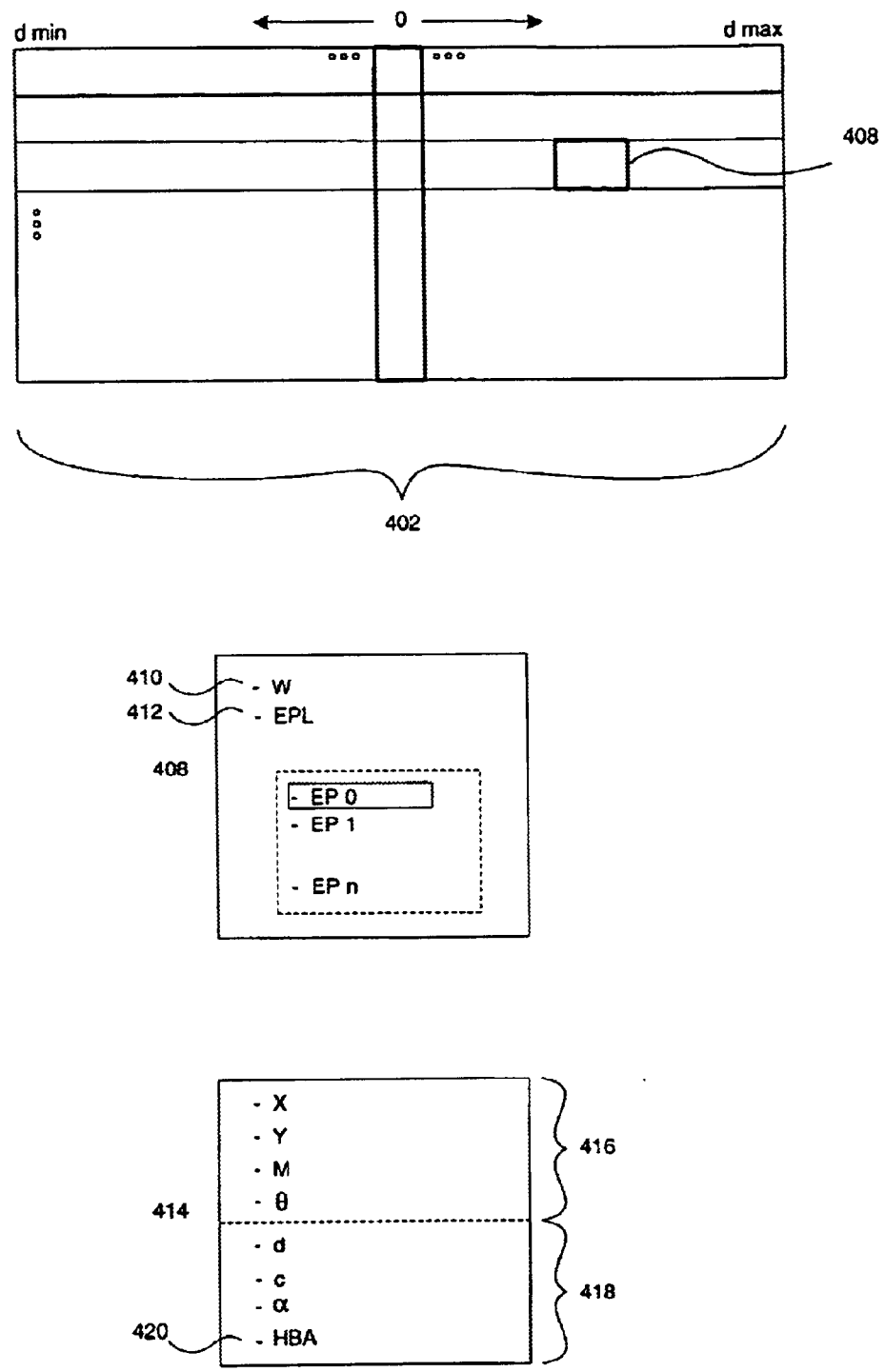
FIG. 4B is a graphical diagram of an annotated Hough space, which uses the line format depicted in FIG. 3. Also shown is a bin thereon, and an edge-point array.
Figure 5:
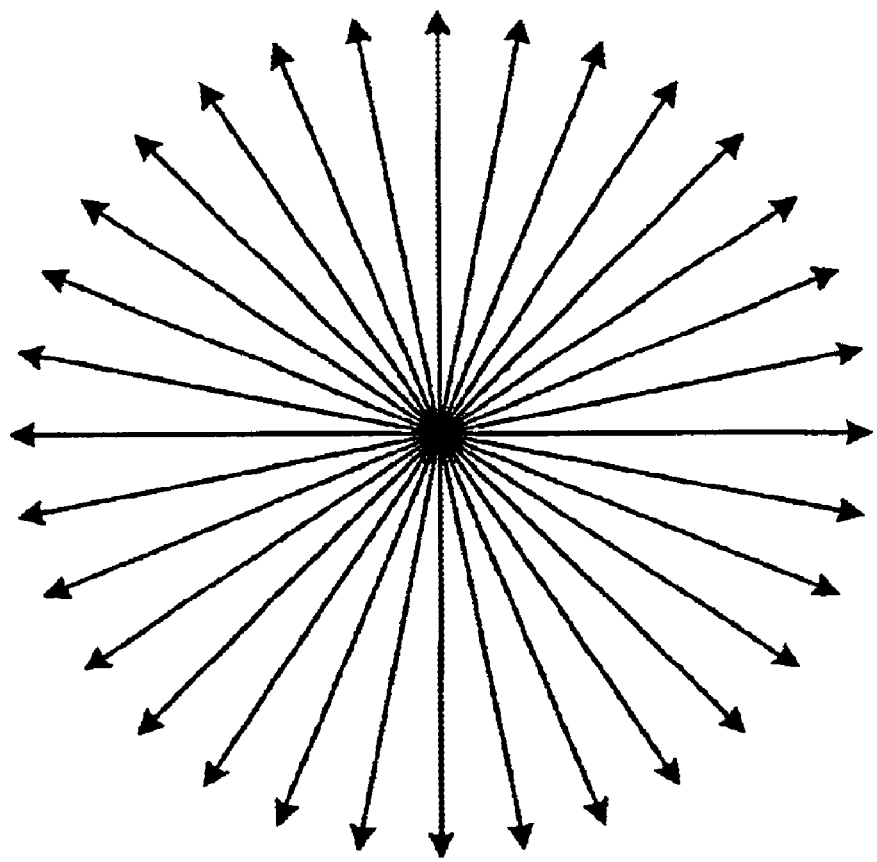
FIG. 5 depicts an instance of a partitioning scheme of a continuous-angle range into discrete, quantized values.
Figure 6:
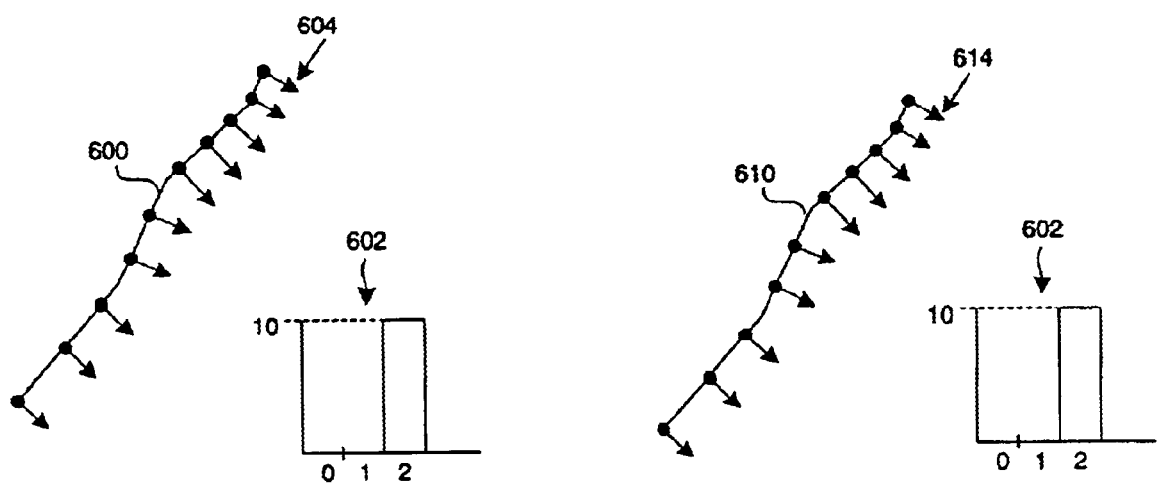
FIG. 6 depicts instances of two contours, edge-points of the contour, edge-point directions, and their respective angle histograms.

In a preferred embodiment, the contour refined is a line, parameterized by d 304 and α302, illustrated on FIG. 3, and represented on a Hough space. The size of the Hough space along the angle axis is computed using principles known in the art, and as further described in Cognex 3000/4000/5000, Programmable Vision Engines, Vision Tools, Chapter 3 Line Finder, pages 166–175, (1996) incorporated herein by reference. FIG. 4B depicts an instance of an annotated Hough space. The size of the Hough space along the distance-vector axis 402, denoted $L_{space}$, is a function of the maximum edge-point position and the resolution chosen by the user, which can be computed using the following equation:

$$L_{space} = \left\lceil \frac{\sqrt{l^2 + h^2}}{g} \right\rceil + 1 \qquad [4]$$

Where g is the range of d for each bin, also called herein the granularity, (typically set from 0.5 to 2.0), and l, h, are the width and height, respectively of the input image. Other techniques can also be used to compute the Hough-space dimensions without departing from the scope of the invention.

In a preferred embodiment, the parameter space does not just contain the weight of the edge points in each of the bins; the parameter space is annotated to also contain references to edge-point data. In the annotated Hough space example of FIG. 4B, each Hough bin 408 will contain a weight field 410 and an edge-point list 412, which contains the addresses of the edge points contributing to the bin. The edge-point list 412 is represented mathematically as a one-dimensional array, denoted $EPL_{d,\alpha}$ ($EP_0$ . . . $EP_n$), containing the addresses of each edge-point array 414, such as address $EPL(EP_0)$. The sum of all edge points in the edge-point lists 412 of all the bins 408 must equal the number of edge points input into the Hough transform, denoted here as N.

An edge-point array 414, associated with each address of the edge-point list 412, contains edge-point data 416, generated earlier during the edge-detection step (804) and, optionally, the peak detection step (806) of FIG. 8, and data generated from the Hough processing 418. The edge-point data 416 includes (X, Y), M and/or θ, where which edge-point data is required will depend upon how the edge-points are annexed and other optional steps, as hereinafter described. The Hough-processing data includes the Hough bin address ("HBA") 420 to which the edge point belongs, and optionally d, α, and c.

In a preferred embodiment, the edge-point list 412 is generated and the HBAs 420 initialized using a two pass technique. The first pass increments the weight 410, W, of each bin 408 pursuant to the Hough transform algorithm previously described, and also initializes the Hough bin address 420, HBA, for each edge-point array 414, $EP_n$. The second pass sets the length of each edge-point list, n, as the value of the weight 410, W, of each of the bins 408; and fills the edge-point list 412, EPL, by adding the address of each edge-point array 414 to the edge-point list 412, EPL, after examining the HBA 420 associated with each edge-point array 414. As necessary, for each embodiment, the other Hough-transform data, being d, α, and c is added to the edge-point array 414, during the first pass, when the HBA is initialized. Thus, each edge-point array 414 is assigned a Hough bin 408, equal to the HBA, and each non-zero weighted Hough bin 408 will contain an address list of the edge points contributing to the respective Hough bin, that is the $EPL_{d,\alpha}$.

Returning to FIG. 8, next, the weight of the bins of the parameter space is searched, in at least one dimension, for local maxima, using peak detection previously described (810). If the groupings are represented as a multi-dimensional array, peak detection is employed in one or more dimensions. Preferably, when one-dimensional peak detection is employed on a multi-dimensional array, the dimension chosen for peak detection is the dimension that exhibits more dispersion of the data or alternatively, it is the dimension for which an embodiment of the hybrid-space of FIG. 13 cannot partially compensate.

The local maxima found are termed seed-peaks, and the seed peaks are ranked according to their weight (811). Other ranking schemes that are tailored to an application can be used without departing from the scope of the invention.

The seed peaks are primary peaks, and, therefore, more likely to represent the proper parameterization of the contour (e.g. d and $\alpha$ of lines from the image in the Hough space example). Considerations, such as processing time, can lead to denoting only a sub-set of the local maxima as seed peaks, without departing from the scope of the invention.

In one embodiment, the seed peaks are ranked according to a spatial distribution of the edge points of the peak in addition to weight of the peak. For lines, the spatial distribution is measured as the variance of the collinear distances of the edge points of the peak. A preferred embodiment ranks lines having more spatially distributed edge points higher than more dense lines, when both lines have substantially the same weight. The invention recognizes that a subsequent line fit, as described hereinafter, is more accurate on edge points distributed over a greater spatial range. Using the teachings herein, those skilled in the art should recognize that the spatial distribution of lines could be used alone, or in conjunction with, other parameters, such as weight, to determine the quality of a line.

Further, using the teachings herein, those skilled in the art should recognize that the spatial distribution of other contours or groupings could be used to bias the designation of a grouping as a primary grouping.

Next, one or more of the edge points are annexed, from one or more bins, to one or more seed peaks (812), thereby, refining the groupings of edge points in one or more bins, as is further described with reference to FIG. 9.

Figure 9:
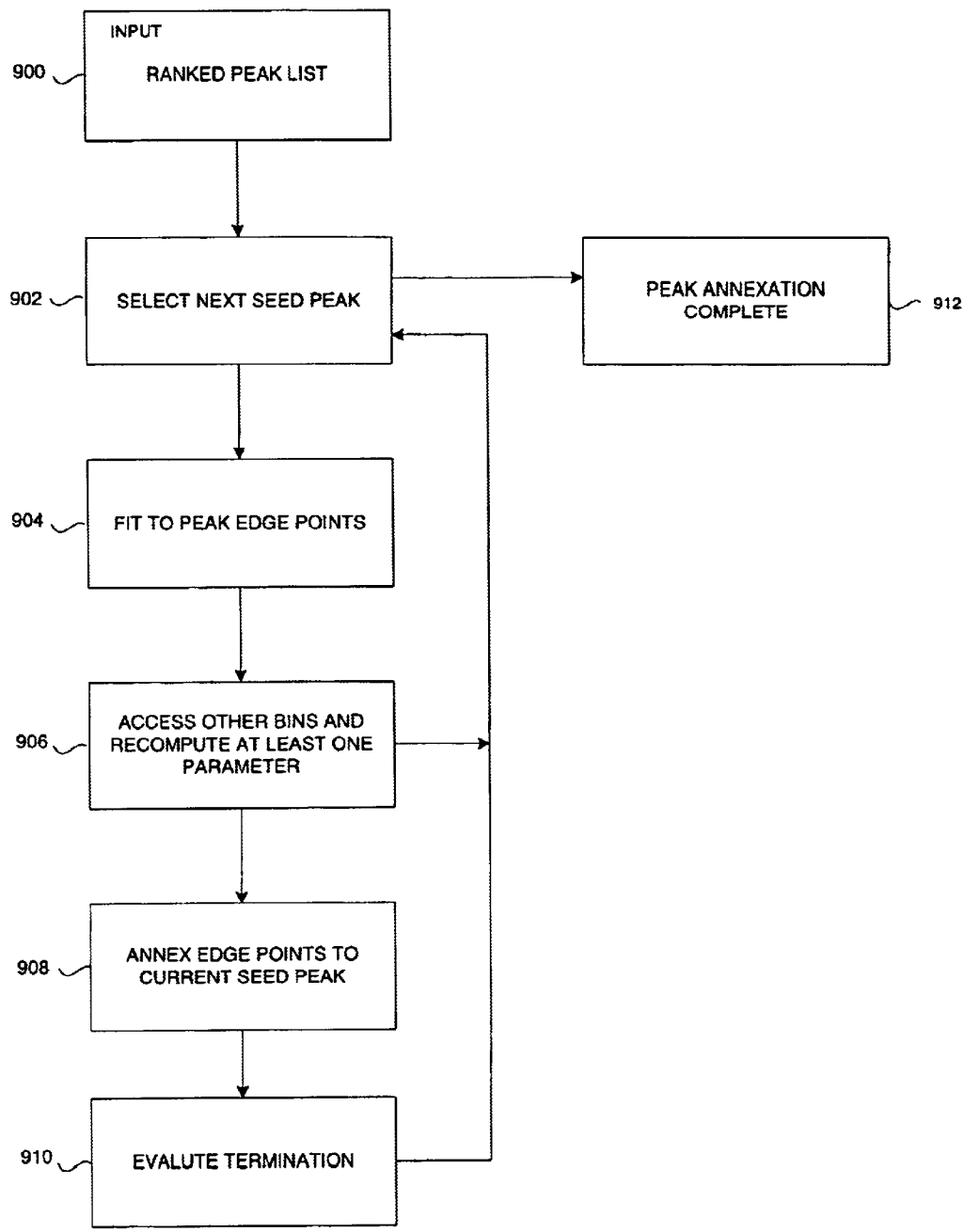
FIG. 9 is a flowchart detailing operation of annexing for one embodiment of the method of FIG. 8.

FIG. 9 details the annexation operation of one embodiment of the method of FIG. 8, where steps of the operation are shown in the detailed description in parentheses. The ranking of the seed peaks is input (900) into the annexation operation.

Preferably, each seed peak is examined sequentially according to the position assigned during ranking (902). Consequently, the edge points of a seed peak can be annexed to a higher ranking seed peak before the seed peak is examined. Other heuristics can be used without departing from the scope of the invention.

Using one embodiment of the Hough space example, an edge point is annexed to a seed peak (908) by re-calculating the distance vector of the edge point (906), using a new edge-point direction, denoted $\theta_{intermediate}$, derived from a least-squares-fit line to the edge points of the seed-peaks (904) in the distance-vector calculation of a Hough transformation, instead of using the edge-point direction, $\theta$, which was previously determined during edge detection (804). This example is described using the diagram of FIG. 10, which illustrates the recovery of edge points, not drawn to scale, with continuing reference to FIG. 9.

Figure 10:
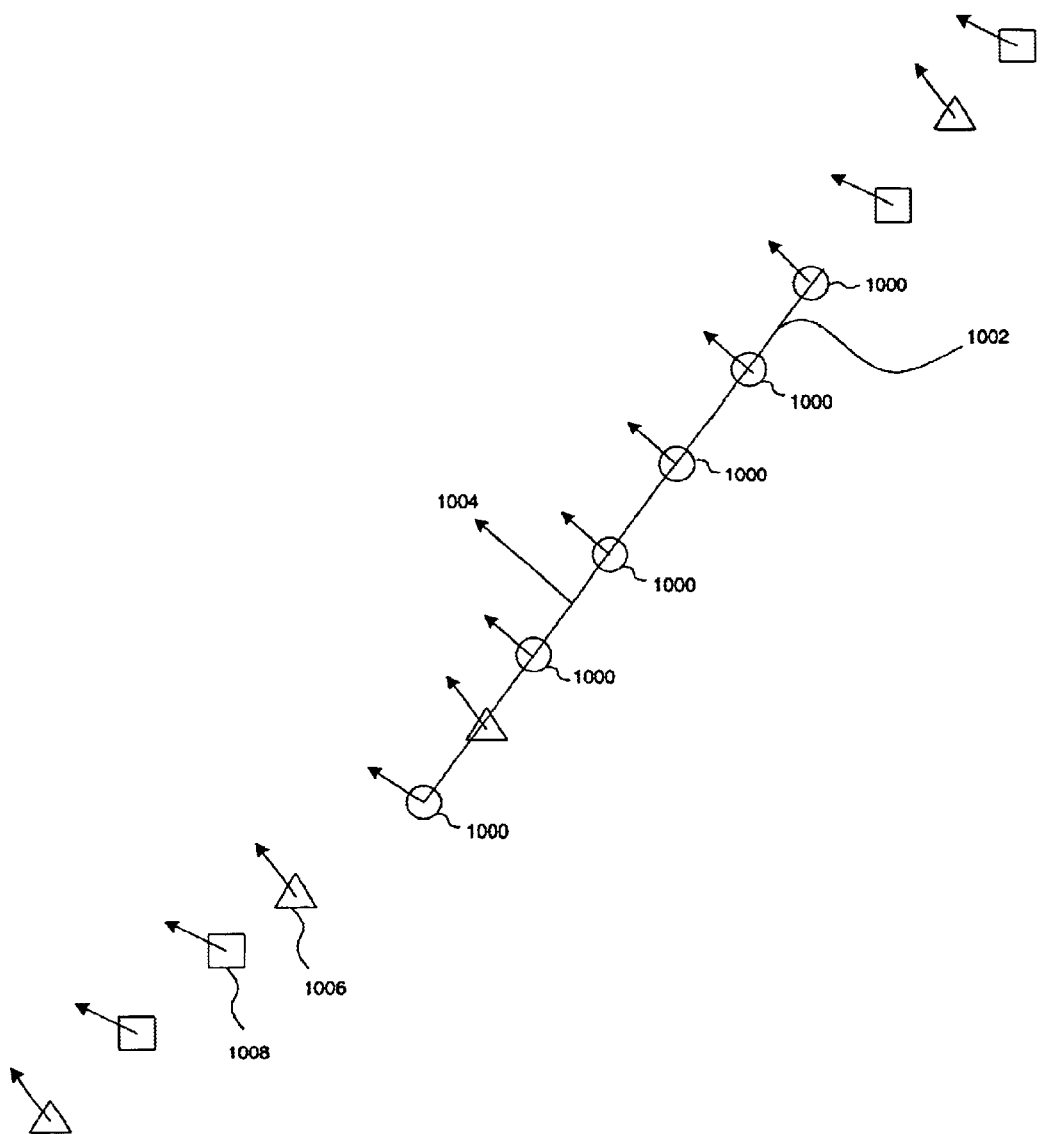
FIG. 10 is a diagram illustrating the recovery of edge points using the annexing of FIG. 9.

FIG. 10 illustrates fourteen edge points and corresponding edge-point directions hypothetically generated using the Hough transform equations hereinbefore described. Six edge points, denoted with a circle, share a common edge-point direction and are the edge points of the seed peak in this example, denoted the seed population 1000. Two sets of four other edge points denoted by triangular edge points 1006 and square edge points 1008, respectively, represent two other adjacent bins of edge points along the distance-vector axis, denoted a triangle bin and a square bin, respectively.

The new edge-point direction, denoted $\theta_{intermediate}$, is generated by first fitting a least-squares line 1002 to the positions of the seed population 1000 (904). The angle 1004 $\alpha_{intermediate}$ of the least-squares line 1002 is converted into an edge-point direction $\theta_{intermediate}$, using the following equation:

$$\theta_{intermediate(degrees)} = \alpha_{intermediate} - 90° \quad [5]$$

Next, in a preferred embodiment, a parameter of the edge points of at least one adjacent bin is recomputed. In this example, the triangle bin along the distance-vector axis is accessed, and the distance vector of the triangular edge points 1006 is re-calculated using $\theta_{intermediate}$ and the underlying triangular edge-point positions in the distance-vector calculation, represented mathematically as follows:

$$d_{refined} = x \cdot \sin(\theta_{intermediate}) - y \cdot \cos(\theta_{intermediate}) \quad [6]$$

Next, if $d_{refined}$ of any of the triangular edge points 1006 are within the range of d for the seed population 1000, then the triangular edge points 1006 are annexed to the seed population 1000 (908).

After all the edge points in the triangular bin are examined, a termination condition is examined (910), which determines whether another bin will be examined. Numerous termination conditions can be used without departing from the scope of the invention, such as a condition which balances processing time over precision, for instance. In a preferred embodiment, the termination condition is that a new bin is not accessed after either finding an empty bin (i.e. a bin having a null weight) or no edge points are annexed from a non-empty bin along both directions of the parameter axis (e.g. both directions of the distance-vector axis).

In this example, after the triangular edge points 1006 are annexed to the seed population 1000, the termination condition is not met (910) so the square bin is accessed (906). $d_{refined}$ is computed for each of the square edge points 1008 (906), and the square edge points 1008 are annexed to the seed population 1000 (908). When all the square edge points 1008 have been examined, the seed population 1000 is refined (i.e. augmented) from a weight of six to a weight of fourteen, including six circular edge points 1000, plus four triangular edge points 1006, and four square edge points 1008.

Once annexing for one seed population is complete (e.g. the termination condition (910) is met), the next seed peak is selected (902), for which the steps (904)–(910) are repeated until no more seed peaks remain to be selected (912).

Other fitting techniques can be used to fit a contour without departing from the scope of the invention, such as an ellipse fit, for example.

Instead of calculating $\theta_{intermediate}$, $d_{intermediate}$ could be calculated using the edge points of the seed-peaks, by averaging, for example. Thereafter $\alpha_{refined}$ is calculated instead of $d_{refined}$ for the edge points of the other bins, and compared with the seed-peak range for $\alpha_{refined}$.

Additionally, $c_{refined}$ can be calculated and used alone, or in conjunction with, the $d_{refined}$ or $\alpha_{refined}$ to determine if the edge point should be annexed to the seed population.

Further, it should be apparent that the distance vector does not need to be re-calculated for all the edge points in each bin, and other variations, depending upon the image and application, can be used, such as, only recalculating d for every third edge point in each bin.

Similarly, not every bin needs to be accessed. Accessing just the neighboring bins or every third bin, for example, may be sufficient for certain applications. In applications other than Hough, the accessed bins are chosen according to their relative position along a boundary or their relative position as stored in a histogram, for example.

Figures 11, 11A:
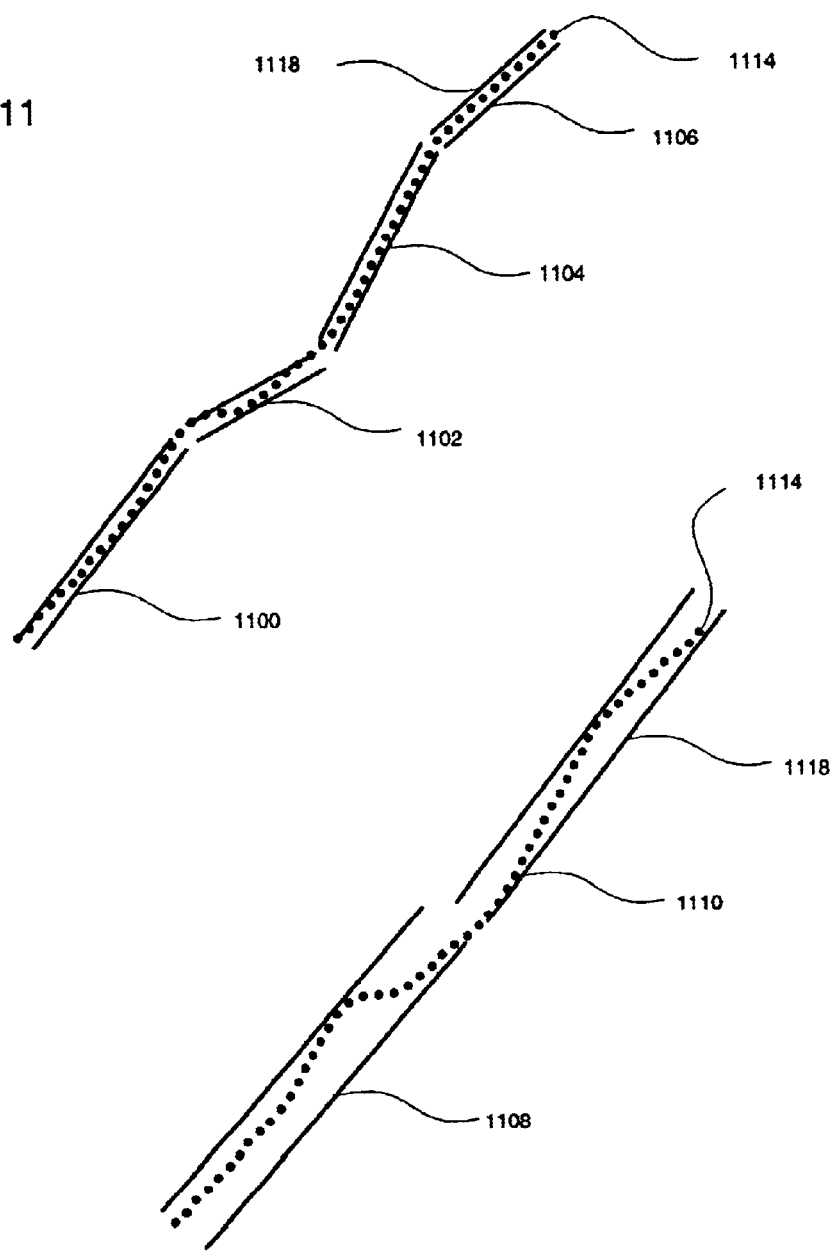
FIG. 11 and FIG. 11A are diagrams illustrating two possible groupings of the same edge points.

Turning to FIG. 11, with continuing reference to FIG. 8, FIG. 11 illustrates an instance of four refined seed populations of edge points 1100, 1102, 1104, and 1106 (i.e. lines) that were generated by the peak annexation (812).

Next, optionally, a second fitting algorithm is performed for each refined seed population to which edge points were annexed (814). For example, four line fits are performed to the edge-points 1114 of each of the seed populations 1100, 1102, 1104, and 1106, respectively. A bisector (not shown) of each pair of parallel lines 1118 represents the line generated from the least-squares line fit to each of the refined seed populations 1100, 1102, 1104, and 1106.

Some applications may require reporting closely spaced contours, such as lines 1100, 1102, 1104, and 1106 as one or two contours, depending upon the objectives of the application (816). For example, in a wirebonder application, one line segment should be reported for each side of a lead. A more abstract definition of a line than that employed heretofore is used to merge the lines 1100, 1102, 1104, and 1106 or other contours. The merging is accomplished using well documented techniques, such as techniques of data clustering analysis, see Anil K. Jain and Richard C. Dubes, "Algorithms for Clustering Data" Chapter 3, pp. 89–101, Prentice Hall, Englewood Cliffs N.J. 1988 incorporated herein by reference.

In one embodiment, lines are grouped (816) by merging all lines having distance-vector values and angle values within a user-supplied tolerance of the distance value and angle value of the refined seed peak with the highest population. Which in this example, is a user-supplied delta from the distance vector and line angle values of the line 1100. The merging results in two groups 1108 and 1110, shown in FIG. 11A, instead of four 1100, 1102, 1104, and 1106.

It should be apparent, that other higher level grouping criteria can be used without departing from the scope of the invention.

If the contours were optionally merged (816), another iteration of the fitting algorithm is performed on the merged segment (818). A bisector (not shown) of each pair of parallel lines 1118 represents a line generated from a least-squares line fit to each of the merged lines 1108 and 1110.

Next, the lines are optionally scored (820) and passed to another algorithm or reported to a user (822).

In a preferred embodiment, the quality of a line is based upon. a composite score of three independent intrinsic properties: edge-point density, accumulated-line-fit error, and edge-point polarization.

Figure 12:
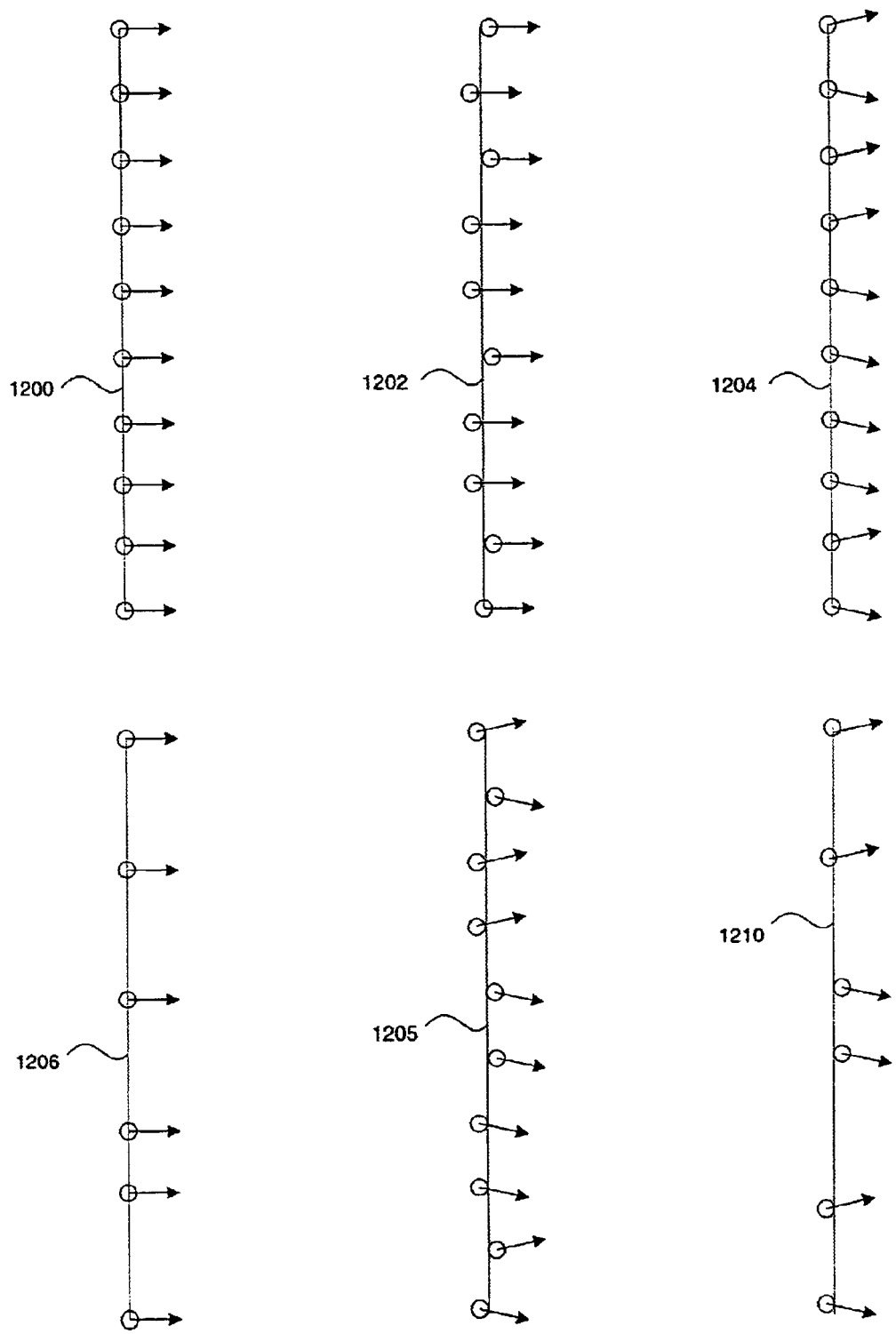
FIG. 12 is a diagram illustrating a plurality of lines, including an idealized line, a line exhibiting an accumulated-line-fit error, a line with edge-point-polarization errors, a line having a small edge-point density, a line having both an accumulated-line-fit error and edge-point-polarization error, and a line having an accumulated-line-fit error, edge-point-polarization error, and small edge-point density, respectively.

FIG. 12 illustrates the three properties. Line 1200 represents an idealized line that has no accumulated-line-fit error (i.e., each edge-point position coincides substantially exactly with the line fit through it); has unit edge-point density (i.e., the edge-points are substantially equally spaced); and has an ideal edge-point polarization (i.e., all the edge-point directions are substantially identical and orthogonal to the line angle.) Line 1202 has an accumulated-line-fit error, where one definition of the error is the orthogonal distance from each edge point to the line summed for all the edge-points of the line. Line 1204 has an edge-point-polarization error, where the error is characterized as the standard deviation of the edge-point directions plus the difference between the mean of the edge-point directions and the expected direction (i.e., the line angle−90°). Other definitions of edge-point polarization error can be used without departing from the scope of the invention, such as using only standard deviation, for example. Line 1206 has unequally spaced edge points, and thus, has an edge-point density less than one. Line 1208 has both accumulated-line-fit and edge-point-polarization errors. Line 1210 has a combination of all three errors.

Edge-point density and accumulated-line-fit error are documented in the art as measures of line quality, see, Bertold K. P. Horn, Robot Vision, pp. 47–55. MIT Press, Cambridge Mass., 1993, incorporated herein by reference.

The invention recognizes that edge-point polarization provides further information about the quality of a line, and is useful alone, or in conjunction with, edge-point density, accumulated-line-fit error, or other line characteristics. Edge-point polarization of a line, and the use of it as a measure of quality of a line, is a recognition of the invention.

Figure 13:
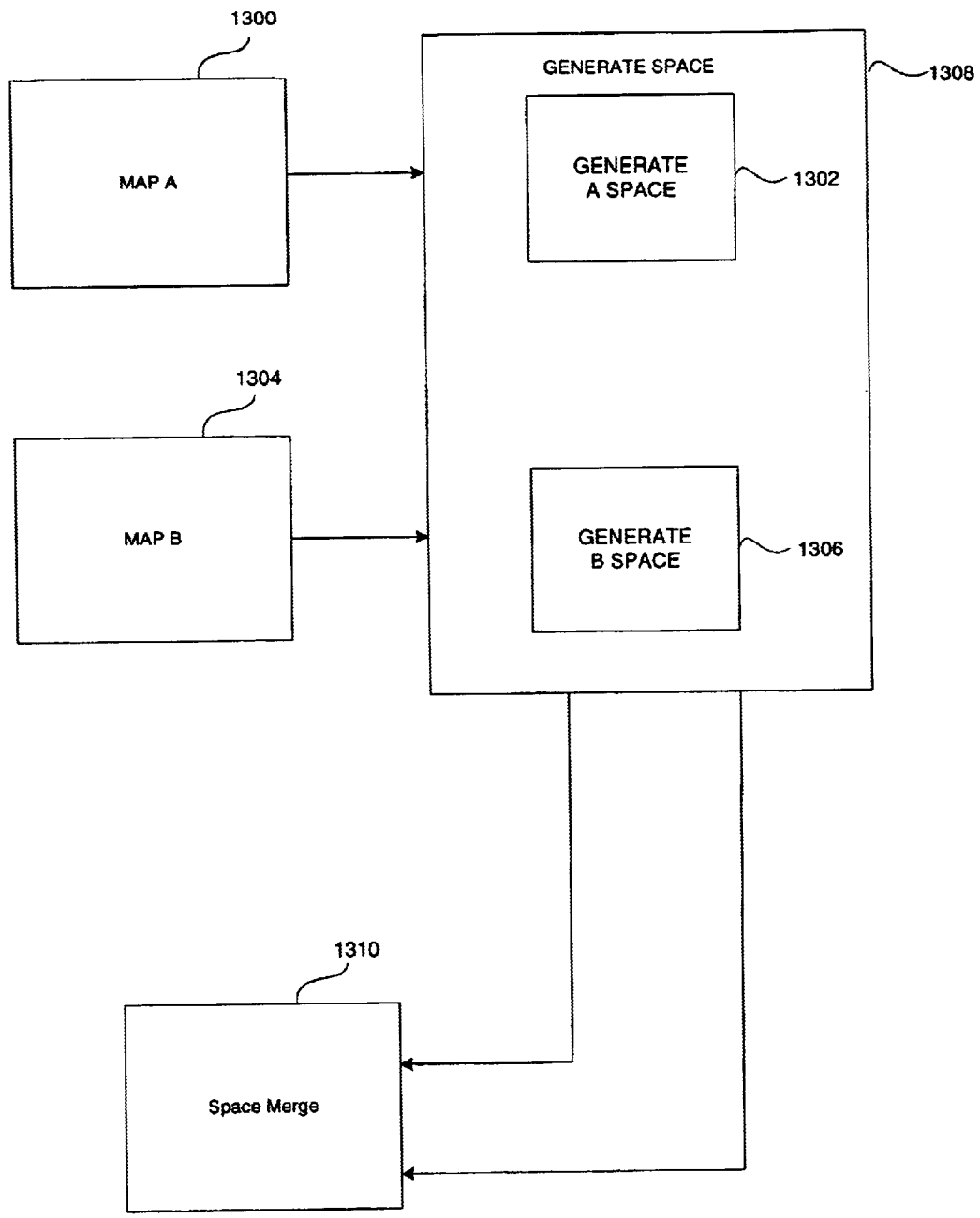
FIG. 13 is a flowchart detailing operation of an embodiment of a method according to the invention that creates a hybrid-parameter space.

An alternate embodiment further refines the extraction of contours by employing a hybrid-parameter space, which is described with reference to FIG. 13. Two parameters spaces are created (1300–1302) and (1304–1306), space A and space B, respectively, each having bin divisions offset from the other by one-half of a bin; and then merged into one hybrid-space (1310) so that each of the edge points is represented once in the hybrid-space. For example, at an angle quantization of five bits (32 states), which yields a resolution of 11.25 degrees/bin, an initial Hough bin using Map A covers the range from 0 to 11.25°, while in the initial Hough bin in Map B covers the range 354.37 to 5.65°. The edge points are represented once on the A space and once on the B space.

The invention recognizes that initially, lines that straddle the boundaries in one mapping are centered within a bin in the second mapping, thus, the edge points will cluster more in an alternate mapping.

Next, the edge points are merged (1310) into one hybrid-space such that each of the edge points is represented once in the hybrid-space. Which mapping, map A or map B, of the edge point is retained in the hybrid-space is determined using a voting procedure, and the resultant hybrid-space is a hybrid space that is composed of bins from both mappings.

In one embodiment, the voting procedure to choose the bins for the hybrid-space is implemented using a two-pass technique adapted from the voting procedure described in J. Brian Burns, Allen R. Hanson, and Edward M. Riseman, "Extracting Straight Lines", IEEE Transactions on Pattern Analysis and Machine Intelligence, 8(4), 1986, incorporated herein by reference. In the first pass, each edge point votes for the bin of space A or space B that possesses the greater weight. At the end of the first pass, each bin in both spaces has a support count. In pass two, the bins for which more than 50% of their constituent edge points have supported them are propagated forward into the hybrid-space. Other voting procedures can be used without departing from the scope of the invention, such as biasing one space over the other, for example.

Additionally, the quantization of parameters from any parameter space, such as the distance-vector, for example, can be addressed by processing the parameters as described with reference to FIG. 13, without departing from the scope of the invention.

Further, it should be apparent to one skilled in the art that more than two parameter spaces can be merged to create the hybrid-space without departing from the scope of the invention, where the spaces are offset by a fraction of a bin.

It should also be apparent that the fractional offset can divide the bin equally, such as ½ and ½, or unequally, such as ¾ and ¼, and will depend upon the application.

It should be apparent to one skilled in the art that the edge points can be grouped by other Hough transforms, such as Hough circles or Hough ellipses, for example.

Further, the edge points of a line can be grouped using other Hough parameterizations, such as a slope-intercept parameterization of a line, for example.

It should also be apparent that the invention can refine one or more parameters stored on a one-dimensional space or multi-dimensional space, respectively such as the parameterization of a Hough ellipse.

It should also be apparent that the group examined for annexing can be the adjacent group or other group directed by an application specific heuristic, which ends as directed by the termination condition, as previously described.

Preferably, the group characteristic is re-calculated using some aspect of the seed population, such as described with reference to FIG. 9, for example. The exact nature of the recalculation is application specific, and can be, for example, using a second boundary extracting method to refine edge data.

It should be apparent that the method can refine many different coarser groupings of edge points. However, the method easily lends itself to refining groupings of edge points in an image that are related to each other by at least one mathematical definition, such as by an equation or approximation.

Those skilled in the art will appreciate that some, or all, of the steps of preprocessing the image, detecting edge points, detecting peaks, annexing edge points, merging lines, scoring lines, and fitting lines described hereinbefore can be combined and effected as hardware implementations, software implementations or a combination thereof.

Furthermore, while many operations are described herein utilizing an image from a industry application, it should be appreciated that any of the images described herein can be subject to further processing, such as by filtering using a gaussian filter, median filter, smoothing filter, morphological filter or the like known in the art, in order to improve image quality.

Those skilled in the art will also realize that using reduced-resolution images to generate the edge points, for example, could decrease processing time. Further, the method can use any combination of full-resolution and reduced-resolution images. However, use of reduced-resolution images typically results in a loss of accuracy.

Those skilled in the art will realize that processing time can also be decreased by performing any of the computations described herein using sampled data, such as generating best-fit equations from sampled data, for example. Sampled data is a subset of the available data points, such as every third data point, for instance.

Other modifications and implementations will occur to those skilled in the art without departing from the spirit and the scope of the invention as claimed. Accordingly, the above description is not intended to limit the invention except as indicated in the following claims.

What is claimed is:

1. A method for refining groupings of edge points of an image, each of the groupings of edge points having a parameter range, and edge point having a parameter substantially within the respective parameter range, the method comprising:

ranking the groupings of edge points so as to produce an ordered set of groupings;

denoting at least one of the groupings of edge points a seed-population based on a respective position within the ordered set, where the parameter range of the seed-population is denoted the seed-parameter range;

recalculating the parameter of one of the edge points from one of the groupings other than the seed-population, by using the seed-population, to produce a refined parameter of the edge point; and annexing the edge point to the seed-population, thereby producing an annexed edge-point, when the refined parameter of the edge point is substantially within the seed-parameter range of the seed-population, thereby providing a refined grouping of edge points for the seed-population containing the seed-population and the annexed edge-point, where the refined grouping represents a refined contour.

2. The method of claim 1, further comprising:

repeating the recalculating and the annexing for remaining edge points from one of the groupings to produce more than one refined parameter and more than one annexed edge-point.

3. The method of claim 2, further comprising:

repeating the annexing for more than one seed-population in sequence according to a position of the seed-population in the ordered set to produce more than one refined grouping of edge points.

4. The method of claim 3, wherein user supplied tolerances are accommodated, the method further comprising:

merging refined groupings of edge points into one grouping of edge points after the annexing using a more abstract application-specific grouping rule, where the application-specific grouping rule is a user supplied tolerance.

5. The method of claim 2, further comprising:

repeating the recalculating for more than the one of the groupings of edge points other than the seed-population.

6. The method of claim 5, wherein repeating the recalculating from more than one of the groupings further comprises:

ordering the recalculating for more than one of the groupings of edge points other than the seed-population using a termination condition.

7. The method of claim 5, wherein the groupings of edge points are bins of edge points in a parameter space, and wherein repeating the recalculating from more than one of the groupings further comprises:

recalculating the parameters of the edge points from neighboring bins of the seed-population in sequence.

8. The method of claim 5, wherein repeating the recalculating from more than one of the groupings further comprises:

stopping the recalculating of the more than one of the groupings of edge points other than the seed-population using a termination condition.

9. The method of claim 5, wherein the groupings of edge points are bins of edge points in a parameter space, and wherein repeating the recalculating from more than one of the groupings further comprises:

stopping when no edge points are annexed from one of the bins.

10. The method of claim 1, wherein the edge points are clustered together within the respective groupings of edge points using individual characteristics of each of the edge points, the method further comprising:

storing at least a portion of the individual characteristics of the edge points after the clustering.

11. The method of claim 10, wherein recalculating the parameter of one of the edge points includes:
   calculating an intermediate characteristic using the individual characteristics of the edge points in the seed-population; and
   recalculating the parameter of the edge point from one of the groupings of edge points other than the seed-population using the intermediate characteristic so as to produce the refined parameter.

12. The method of claim 11, wherein at least one of the individual characteristics are edge positions of the edge points, and wherein calculating the intermediate characteristic further comprises:
   applying a fitting-regression technique to the edge positions of the edge points in the seed-population to produce the line angle.

13. The method of claim 12, wherein the individual characteristics are related to the parameter by a mathematical relationship.

14. The method of claim 1, further comprising:
   generating a second refined parameter of the contours using positions of the edge points in the refined groupings of data.

15. The method of claim 1, further comprising:
   scoring the lines by a function of accumulated line fit error, deviations among edge-point directions, and edge-point density of each of the contours.

16. The method of claim 1, further comprising:
   scoring the contours by deviations among edge-point direction of the edge points in each of the contours.

17. The method of claim 16, wherein the contours are lines and scoring the lines further comprises:
   comparing a line angle with the deviations among the edge points and scoring the lines by the deviations among edge-point direction and difference between the line angle and the edge-point directions.

18. The method of claim 1, wherein the contour is a defined by a mathematical description.

19. The method of claim 5, wherein the groupings of edge points are bins of edge points in a parameter space.

20. The method of claim 19, wherein the edge points have a position, the method further comprising:
   recording the position of the edge points in the bins.

21. The method of claim 19, wherein the contour is a line and each of the edge points in the bins has a collinear distance, and wherein the ranking includes:
   finding variances of the collinear distances of the edge points in each of the bins; and
   ranking the bins using the variances to produce the ordered set of bins.

22. The method of claim 1, wherein the contour is a line, the parameters space is a Hough space, the parameter range is a distance-vector range, the parameter is a distance vector, and the refined parameter is a refined distance-vector.

23. The method of claim 22, wherein each of the edge points in the bins has a collinear distance, and wherein the ranking includes:
   finding variances of the collinear distances of the edge points in each of the bins; and
   ranking the bins using a product of the variances and weight of the bins, respectively, to produce the ordered set of bins.

24. The method of claim 22, wherein each edge point has a edge position, and wherein recalculating the parameter includes:
   calculating a line angle for the seed-population using the edge positions of the edge points in the seed-population; and
   recalculating the distance vector of the edge point, from at least one of the groupings of edge points other than the seed-population, using the line angle and the edge position of the edge point, thereby producing the refined distance-vector.

25. The method of claim 22, wherein the parameter space is denoted a first parameter space, the method further comprising:
   generating a second parameter space containing the edge points, the first parameter space and the second parameter space being offset in a first dimension; and
   merging the second parameter space and the first parameter space to create one hybrid-parameter space such that each of the edge points is substantially represented once in the hybrid-parameter space.

26. The method of claim 22, wherein ranking further comprises:
   finding at least one local maxima of a weight of the bins in at least one search-dimension of the parameter space;
   ranking the bins using-the at least one local maxima to produce the ordered set of bins; and
   wherein the first dimension is a dimension different from the at least one search-dimension.

27. An apparatus for refining groupings of edge points of an image, each of the groupings of edge points having a parameter, the apparatus comprising:
   ranking means adapted to rank the groupings of edge points so as to produce at least one local maxima denoted a seed-population, where the parameter of the seed-population being denoted the seed-parameter;
   recalculating means, in communication with the ranking means, adapted to recalculate the parameter of one of the edge points from one of the groupings of edge points other than the seed-population, by using the seed population, so as to produce a refined parameter of the edge point; and
   annexing means, in communication with the recalculating means, adapted to annex the edge point to the seed-population, thereby producing an annexed edge-point, when the refined parameter of the edge point is substantially within the seed-parameter of the seed-population, thereby providing a refined grouping of edge points for the seed-population containing the seed-population and the annexed edge-point, where the refined grouping of edge points represents a contour in the image.

28. The apparatus of-claim 27, wherein
   the recalculating means is adapted to repeat for remaining edge points from one of the groupings of edge points to produce more than one refined parameter, and wherein the annexing means is adapted to repeat for remaining edge points from one of the groupings of edge points to produce more than one annexed edge-point.

29. The apparatus of claim 27, wherein
   the annexing means is adapted to repeat for more than one seed-population the annexing in sequence according to a position of the seed-population in the ordered set to produce more than one refined grouping of edge points.

30. The apparatus of claim 27, wherein
   the recalculating means is adapted to repeat for more than one of the groupings of edge points other than the seed-population.

31. The apparatus of claim 27, wherein the groupings of edge points are bins of edge points in a parameter space.

* * * * *